United States Patent
Hill et al.

(10) Patent No.: US 9,487,301 B2
(45) Date of Patent: Nov. 8, 2016

(54) HIGH EFFICIENCY EXTERNAL AIRBAG FOR CRASH ATTENUATION

(75) Inventors: Andrew T. Hill, Arlington, TX (US); Zi Lu, Coppell, TX (US); Robert S. Lynds, Santa Barbara, CA (US); Andrew R. Hansen, Goleta, CA (US)

(73) Assignee: Textron Innovations Inc., Providence, RI (US)

( * ) Notice: Subject to any disclaimer, the term of this patent is extended or adjusted under 35 U.S.C. 154(b) by 268 days.

(21) Appl. No.: 13/696,970

(22) PCT Filed: Feb. 23, 2011

(86) PCT No.: PCT/US2011/025857
§ 371 (c)(1),
(2), (4) Date: Nov. 8, 2012

(87) PCT Pub. No.: WO2012/115633
PCT Pub. Date: Aug. 30, 2012

(65) Prior Publication Data
US 2013/0062465 A1     Mar. 14, 2013

(51) Int. Cl.
*B64D 25/00*     (2006.01)
*B64C 25/52*     (2006.01)
*B64C 25/32*     (2006.01)

(52) U.S. Cl.
CPC .............. *B64D 25/00* (2013.01); *B64C 25/52* (2013.01); *B64C 2025/325* (2013.01); *B64D 2201/00* (2013.01)

(58) Field of Classification Search
CPC . B64C 25/32; B64C 25/56; B64C 2025/325; B64C 27/006; B64D 25/00; B64D 25/18; B64D 2201/00

USPC .......... 244/107, 100 A, 139; 280/728.1, 729, 280/730.1, 743.2; 188/298, 377
See application file for complete search history.

(56) References Cited

U.S. PATENT DOCUMENTS

| | | | | |
|---|---|---|---|---|
| 1,257,413 A | * | 2/1918 | Sloper | ...................... 244/100 A |
| 2,131,528 A | | 9/1938 | Soyer | |
| 2,713,466 A | | 7/1955 | Fletcher et al. | |

(Continued)

FOREIGN PATENT DOCUMENTS

| | | |
|---|---|---|
| DE | 3024551 A1 | 1/1982 |
| DE | 4118300 A1 | 12/1992 |

(Continued)

OTHER PUBLICATIONS

International Search Report and the Written Opinion of the International Searching Authority mailed by ISA/USA, U.S. Patent and Trademark Office on Apr. 25, 2011 for International Patent Application No. PCT/US11/025857, 8 pages.

(Continued)

*Primary Examiner* — Joseph W Sanderson
(74) *Attorney, Agent, or Firm* — James E. Walton

(57) ABSTRACT

An external airbag for an aircraft includes an inflatable bladder having a top portion and a bottom portion, the top portion being generally adjacent to an exterior of the aircraft. A widthwise panel divides the inflatable bladder into a first cylindrical portion and a second cylindrical portion. The widthwise panel acts to restrict outward bulging of the inflatable bladder. An aperture in the widthwise panel may be used for allowing gas communication between the first cylindrical portion and a second cylindrical portion.

15 Claims, 7 Drawing Sheets

(56) References Cited

U.S. PATENT DOCUMENTS

| | | | |
|---|---|---|---|
| 3,129,909 A * | 4/1964 | Smith | 244/107 |
| 3,154,270 A * | 10/1964 | Jensen | 244/101 |
| 3,602,661 A | 8/1971 | Liedberg | |
| 3,603,535 A | 9/1971 | DePolo | |
| 3,727,716 A | 4/1973 | Jenkins | |
| 3,738,597 A | 6/1973 | Earl et al. | |
| 3,964,698 A | 6/1976 | Earl | |
| 3,981,462 A | 9/1976 | Berezhnoi et al. | |
| 3,990,658 A | 11/1976 | Letsinger | |
| 4,004,761 A | 1/1977 | McAvoy | |
| 4,032,088 A | 6/1977 | McAvoy | |
| 4,068,606 A | 1/1978 | Van Veldhuzen | |
| 4,165,059 A * | 8/1979 | Summer | 244/100 A |
| 4,205,811 A * | 6/1980 | Palm et al. | 244/100 A |
| 4,645,142 A * | 2/1987 | Soelter | 244/100 A |
| 4,655,415 A * | 4/1987 | Miller et al. | 244/105 |
| 4,657,516 A | 4/1987 | Tassy | |
| 4,697,762 A * | 10/1987 | Arney | 244/101 |
| 5,259,574 A | 11/1993 | Carrot | |
| 5,356,097 A | 10/1994 | Chalupa | |
| 5,407,150 A | 4/1995 | Sadleir | |
| 5,560,568 A | 10/1996 | Schmittle | |
| 5,725,244 A | 3/1998 | Cundill | |
| 5,765,778 A | 6/1998 | Otsuka | |
| 5,836,544 A | 11/1998 | Gentile | |
| 5,992,794 A | 11/1999 | Rotman et al. | |
| 6,070,546 A | 6/2000 | Downey et al. | |
| 6,158,691 A | 12/2000 | Menne et al. | |
| 6,227,325 B1 | 5/2001 | Shah | |
| 6,273,463 B1 | 8/2001 | Peterson et al. | |
| 6,338,456 B1 | 1/2002 | Cairo-Iocco et al. | |
| 6,439,256 B2 | 8/2002 | Koelsch et al. | |
| 6,648,371 B2 | 11/2003 | Vendely et al. | |
| 6,820,898 B2 | 11/2004 | Dinsdale et al. | |
| 6,886,776 B2 | 5/2005 | Wagner et al. | |
| 7,232,001 B2 | 6/2007 | Hakki et al. | |
| 7,549,674 B2 * | 6/2009 | Yoshikawa et al. | 280/740 |
| 7,828,326 B2 * | 11/2010 | Arez et al. | 280/739 |
| 7,954,752 B2 | 6/2011 | Smith et al. | |
| 8,870,115 B2 * | 10/2014 | Lu et al. | 244/100 A |
| 2003/0062443 A1 | 4/2003 | Wagner et al. | |
| 2003/0192730 A1 | 10/2003 | Kikuchi et al. | |
| 2005/0077426 A1 | 4/2005 | Simard | |
| 2005/0098995 A1* | 5/2005 | Fischer | 280/743.2 |
| 2007/0246922 A1 | 10/2007 | Manssart | |
| 2008/0087511 A1 | 4/2008 | Taylor et al. | |
| 2013/0032665 A1* | 2/2013 | Lu et al. | 244/100 A |
| 2013/0068883 A1* | 3/2013 | Lu et al. | 244/100 A |

FOREIGN PATENT DOCUMENTS

| | | | |
|---|---|---|---|
| EP | 1403180 A2 | 3/2004 | |
| JP | 5322496 A | 12/1993 | |
| JP | 8192797 | 7/1996 | |
| JP | 11268605 A | 10/1999 | |
| WO | 2006046038 A2 | 5/2006 | |

OTHER PUBLICATIONS

Office Action dated Aug. 6, 2014 from counterpart EP App. No. 11859409.2.

"CABS Cockpit Air Bag System," Armor Holdings Aerospace & Defense Group, Jan. 2006.

Akif Bolukbasi, "Active Crash Protection Systems for UAVs," American Helicopter Society Annual Forum 63 Proceedings, Virginia Beach, VA, May 1-3, 2007.

Akif Bolukbasi, "Active Crash Protection Systems for Rotorcraft," Center for Rotorcraft Innovation/National Rotorcraft Technology Center Program 2007 Year End Review, Phoenix, AZ, Feb. 19-20, 2008.

Rejection Notice for Japanese Application No. 2008-542336, dated Feb. 23, 2011, 1 page.

REAPS Rotorcraft Protection, Brochure by RAFAEL Armament Development Authority, Ltd., Ordnance Systems Division, Haifa, Israel.

Kevin Coyne, F-111 Crew Module Escape and Survival Systems, pp. 1-10, http://www.f-111.net/ejection.htm.

Specification for PCT/US09/51821 filed on Jul. 27, 2009.

Response to Invitation to Correct Defects for PCT/US09/51821 dated Sep. 16, 2009.

International Search Report for PCT/US09/51821 dated Sep. 11, 2009.

Specification for PCT/US07/82140 filed on Oct. 22, 2007.

International Search Report for PCT/US07/82140 dated Apr. 18, 2008.

Article 34 Amendments for PCT/U307/82140 filed on Aug. 18, 2008.

International Publication of PCT/US07/82140 published on Apr. 30, 2009.

Article 34 Amendments for PCT/US07/82140 filed on Oct. 13, 2009.

Office Action from Corresponding Canadian Application No. 2,628,380, dated Dec. 23, 2009.

Office Action for U.S. Appl. No. 12/089,884, dated Aug. 6, 2010.

Office Action for U.S. Appl. No. 12/089,884, dated Dec. 8, 2010.

Notice of Allowance for U.S. Appl. No. 12/089,884, dated Jan. 26, 2011.

Office Action from Corresponding Canadian Application No. 2,628,380, dated Feb. 8, 2011.

First Examination Report from Corresponding Mexican Application No. Mx/2008/0060008, dated Mar. 22, 2011.

International Search Report for PCT/US06/43706 dated Jul. 18, 2008.

International Preliminary Report on Patentability for PCT/US06/43706 dated Mar. 19, 2009.

First Office Action in Chinese Application No. 200680041870.7 by the Chinese Patent Office, dated Apr. 29, 2011.

Notification of the Decision to Grant a Patent Right for Patent for Invention issued by the Patent Office of the People's Republic of China for related Chinese Patent Application No. 200680041870.7 on Jan. 21, 2012.

First Office Action from application 2007801012216. Issued from the Chinese Patent Office dated Apr. 27, 2012, 5 pages.

Extended European Search Report dated Aug. 6, 2012 from related European Patent Application No. 07844510.3.

Specification for PCT/US06/43706 filed Nov. 8, 2006.

Response to Invitation to Correct Defects for PCT/US06/43706 dated Apr. 7, 2008.

Publication of PCT/US06/43706 dated May 8, 2008.

International Preliminary Report on Patentability mailed by IPEA/US on Sep. 28, 2011 for International Patent Application No. PCT/US09/51815, 4 pages.

International Search Report and the Written Opinion of the International Searching Authority mailed by ISA/USA, U.S. Patent and Trademark Office on Jun. 13, 2011 for International Patent Application No. PCT/US11/030514, 8 pages.

International Publication of related PCT Application No. PCT/US/09/051821 filed Jul. 27, 2009; Publication No. WO 2011/014153 A1.

Search Report in related European patent application No. 11859409, mailed Feb. 11, 2014, 3 pages.

Examination Report in related European patent application No. 11859409, mailed Feb. 26, 2014, 5 pages.

Office Action dated Sep. 8, 2014 from counterpart CA App. No. 2,828,084.

Office Action dated Apr. 21, 2015 from counterpart CA App. No. 2,828,084.

\* cited by examiner

HIGH EFFICIENCY EXTERNAL AIRBAG FOR CRASH ATTENUATION

TECHNICAL FIELD

The system of the present application relates to external airbags for a vehicle. In particular, the system of the present application relates to highly efficient shape for an external airbag for an aircraft.

DESCRIPTION OF THE PRIOR ART

Conventional airbags are manufactured in a wide variety of shapes and sizes. The geometry of an airbag typically is an important factor in how the airbag will function during operation. Although the developments in airbag systems have produced significant improvements, considerable shortcomings remain.

BRIEF SUMMARY

The airbag assemblies described below provide significant advantages, including (1) providing an external airbag that closely resembles a space efficient optimal airbag shape, such as a rectangular prism, while also reaping the compression benefits of a vertical cylinder shape; (2) providing an external airbag that reduces peak decelerative forces on an aircraft during an impact; (3) providing an external airbag having increased stroke efficiency, thereby allowing the external airbag to have lower height than would otherwise be required, and (4) providing an external airbag that resists rolling over when the aircraft having a forward velocity component impacts the impact surface.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
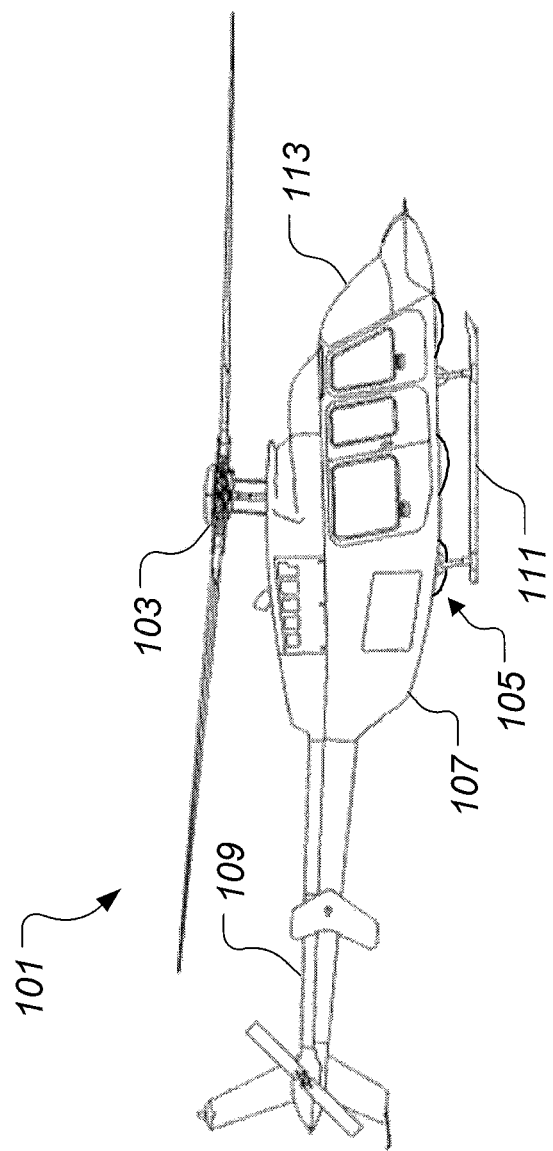
FIG. 1 is a perspective view of a rotorcraft equipped with an external airbag assembly, according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 shows a rotorcraft 101 incorporating the crash attenuation system according to the present application. Rotorcraft 101 comprises a fuselage 107 and a tail boom 109. A rotor system 103 provides lift and propulsive forces for flight of rotorcraft 101. A pilot sits in a cockpit 113 in a forward portion of fuselage 107. A landing gear 111 extends from a lower portion of fuselage 107 for supporting rotorcraft 101 on a rigid surface, such as the ground. At least one airbag assembly 105 is located approximate to the lower portion of fuselage 107. Each airbag assembly 105 may be external mounted, as shown in FIG. 1. Alternatively, each airbag assembly 105 may be internally mounted with tangible covers so that the airbags are deployable to the exterior of aircraft 101. It should be appreciated that even though landing gear 111 is depicted as skid gear, the systems of the present application may be implemented on a rotorcraft having other types of landing gear, such as a retractable landing gear, for example.

A malfunction with rotor system 103, the drive system, or any other flight critical component, may necessitate a descent from altitude at a higher rate of speed than is desirable. If the rotorcraft impacts an impact surface at an excessively high rate, the occupants of rotorcraft 101 may be severely injured due to the sudden decelerative forces. Further, such an impact may cause rotorcraft 101 to be severely damaged by the decelerative forces exerted on rotorcraft 101. To reduce these forces, the crash attenuation system includes at least one airbag assembly 105. Each airbag assembly 105 contains an inflatable airbag bladder 121 that is inflated prior to impact. Each airbag is vented during impact for energy attenuation and so as to prevent an undesired secondary impact. In FIG. 1, each airbag assembly 105 is illustrated in an un-inflated stowed condition. The rotorcraft 101 preferably includes six airbag assemblies 105 in two rows have three airbag assemblies each. However, it should be appreciated that the quantity, size, and other features of each airbag assembly 105 may vary according to the specific aircraft. Each airbag assembly 105 does a specific amount of work during crash attenuation; as such, the configuration and number of airbag assemblies 105 is at least partly driven by the mass of the aircraft. The system can be used on a number of different types of aircraft, for example, helicopter, fixed wing aircraft, and other aircraft, and in particular those that are rotorcraft.

Figure 2:
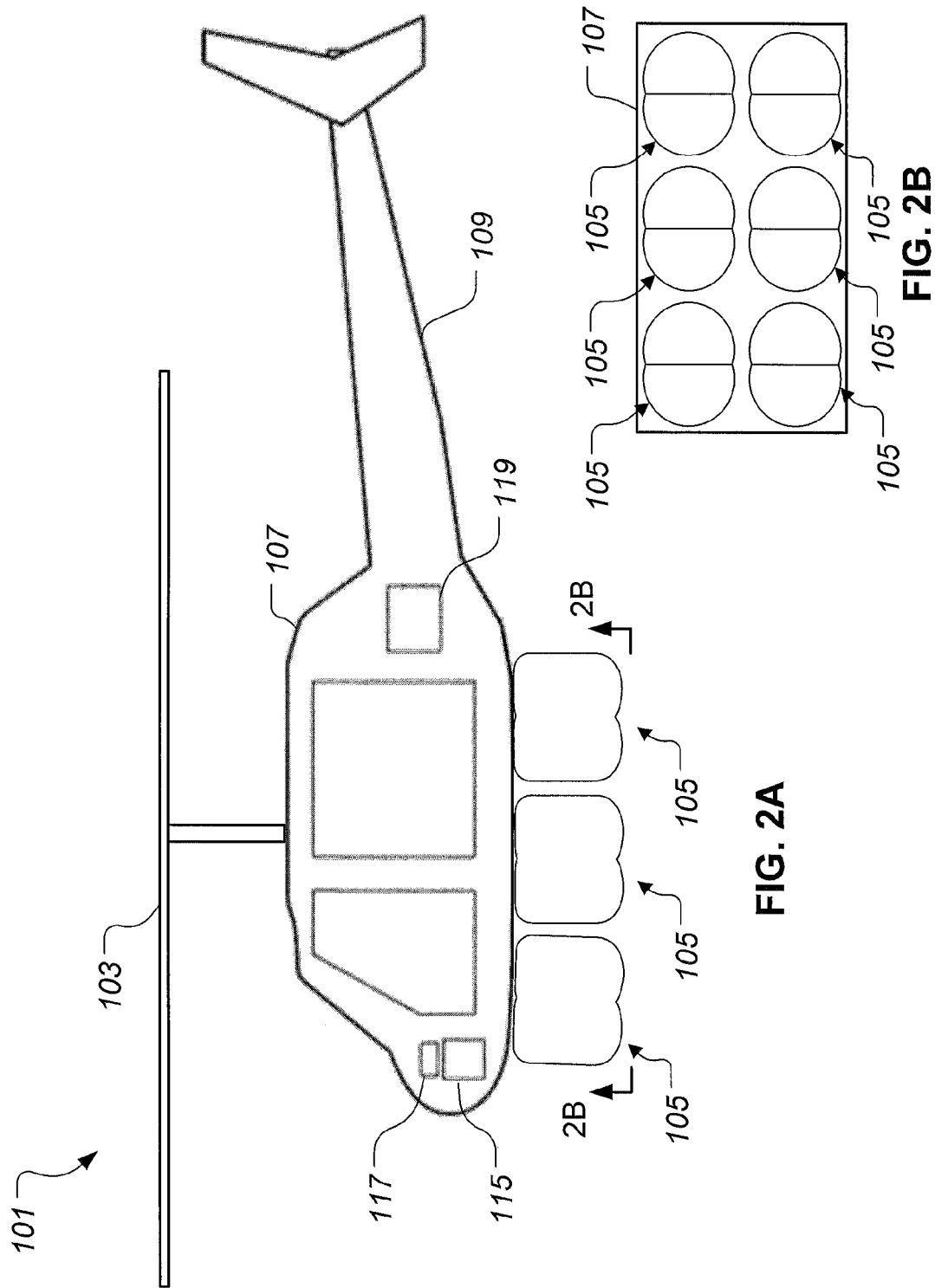
FIGS. 2A and 2B are stylized block diagrams of the rotorcraft shown in FIG. 1.

Referring now to FIGS. 2A and 2B, airbag assembly 105 is illustrated in conjunction with a schematic of rotorcraft 101. Each airbag assembly 105 is shown as fully inflated and mounted to a lower portion of the fuselage 107. FIG. 2A also schematically illustrates additional components of the crash attenuation system according to the present application. A computer-based control system 115, which is shown mounted within fuselage 107, controls the operation of components associated with each airbag assembly 105. A gas controller 119 is operably associated with each airbag assembly 105 for controlling one or more gas generators for inflation of each airbag bladder. In addition, the crash attenuation system has a sensor system 117 for detecting crash conditions, such as rate of descent and/or ground proximity. Sensor system 117 may also have a water-detection system (not shown), which may have sensors mounted on fuselage 107 for detecting a crash in water. Gas controller 119, components for each airbag assembly 105, and sensor system 117 are in communication with control system 115, allowing control system 115 to communicate with, monitor, and control the operation of these attached components. In addition, control system 115 may be in communication with a flight computer or other system for allowing the pilot to control operation of the crash attenuation system. For example, the pilot may be provided means to override, disarm, or arm the crash attenuation system.

The sensor system 117 is shown in FIG. 2A as a discrete component for the sake of convenience. However, it should be noted that actual implementations of the sensor system 117 can comprise a number of components that are located at various locations on the rotorcraft 101. The sensor system 117 may include, for example, sensors for detecting pitch and roll attitude, pitch and roll rate, airspeed, altitude, rate of descent, fluid at impact surface, and slope of the impact surface.

It is desirable for each airbag assembly 105 to be as efficient as possible at attenuating energy during a crash. Because each airbag assembly 105 is carried by an aircraft, each airbag assembly 105 ideally provides maximum energy attenuation while adding minimum weight to the aircraft. Furthermore, an unnecessarily heavy airbag assembly 105 increases the airframe structure required to support the weight, and also decreases the payload capabilities of the rotorcraft 101. Further, an efficient external airbag can have a lower profile than a less efficient airbag, thereby reducing aerodynamic drag, both while in a stowed position and an inflated position.

The present application includes the discovery that certain airbag shapes provide better energy attenuation than other shapes. Optimal energy attenuation includes minimizing the peak accelerations of the aircraft during a crash landing. Optimal energy attenuation relies, in part, upon providing optimal surface contact between the airbag assemblies 105, the ground surface, and the fuselage of the rotorcraft 101. Optimal energy absorption through maximum stroke efficiency is partly obtained by tailoring the shape of each airbag assembly 105. Furthermore, maximizing stroke efficiency while reducing the peak acceleration is achieved by selectively using one or more panels in the interior of the airbag to selectively reduce the amount the airbag billows out when pressurized. As such, the internal panels can be used to control the shape of the airbag bladder so that the airbag assembly 105 performs efficiently.

According the present application, an efficient theoretical shape of an external airbag is a vertical cylinder or other shape having a relatively flat top and bottom, with radially shaped sides extending between the top and bottom surfaces. Such a shape promotes compression along a center lengthwise axis of the vertical cylinder, which is generally normal to the aircraft. Such a cylindrical shape provides an efficient shape for energy attenuation by providing approximately linear deceleration of the rotorcraft. However, for practical applications where pressure against the vehicle's outer skin must be minimized, a rectangular prism or cuboid shape is ideal as it maximizes contact area for multiple airbags mounted on the underside of a vehicle. The present application includes approximating a space efficient rectangular prism shape while also reaping the compression benefits of a vertical cylinder.

Figure 3:
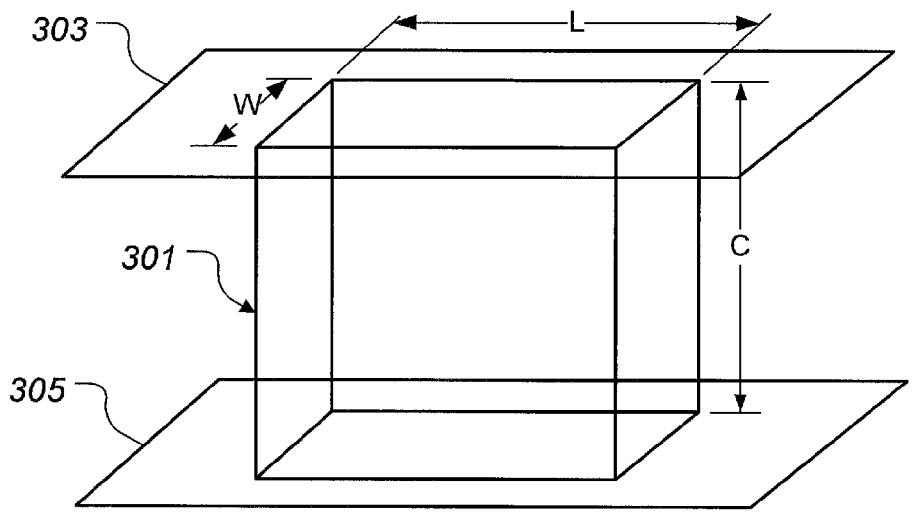
FIG. 3 is a schematic view of an exemplary shape of an external airbag.

Referring to FIG. 3, an exemplary space efficient rectangular prism shape 301 is illustrated. It should be appreciated that neither a length dimension L, a width dimension W, or a height dimension C need equal each other. A surface 303 is symbolic of an underside portion of the fuselage of rotorcraft 101, while a surface 305 is symbolic of a crash surface, such as the ground. The height dimension C represents the path of compression that occurs during a vertical impact of rotorcraft 101 with the crash surface 305. If the rectangular prism shape 301 can maintain its approximate shape, except for compression through a decreasing dimension C, then the energy attenuation is approximately linear due to a near constant cross-section during the compression. Furthermore, because the upper and lower surfaces of rectangular prism shape 301 are similar to surfaces 303 and 305, respectively, then the rectangular prism shape 301 performs almost maximum stroke efficiency as soon as surfaces 303 and 305 begin compressing the rectangular prism shape 301. Furthermore, rectangular prism shape 301 is efficient in terms of allowing for efficient coverage underneath the fuselage 107 of rotorcraft 101. Rectangular prism shape 301 is space efficient because a plurality of rectangular prisms can be configured to provide substantial coverage to the bottom surface of a fuselage without excess airbag bladder protruding outside the space below the fuselage 107.

However, rectangular prism shape 301 is a difficult shape to exactly duplicate with an airbag bladder. This is primarily due to an airbag bladder being a pressure vessel formed with a flexible fabric. The airbag bladder is inflated to a pre-defined pressure, thereby causing the flexible fabric side walls to naturally want to bulge away, thus deforming away from the ideal rectangular prism shape. For example, when shape 301 is pressurized, then upper and lower surfaces of the rectangular prism shape 301 want to deform radially outward. If this deformation were allowed, then compression would result in a non-constant compressive force during the complete compressive stroke. Furthermore, during an impact, the pressure within the airbag bladder increases, thereby further contributing to natural tendency for the walls of rectangular prism shape 301 to bulge out. As such, embodiments of the present application represent approximating a space efficient rectangular prism shape while also reaping the compression benefits of a vertical cylinder. Furthermore, embodiments of the present application represent inflatable external airbags configured to restrict undesired bulging, thereby inhibiting deviation from an optimal shape. Furthermore, the inflatable external airbags are configured to provide maximum stroke efficiency during impact, thereby limiting an undesired spike in aircraft deceleration during a crash.

Figure 4:
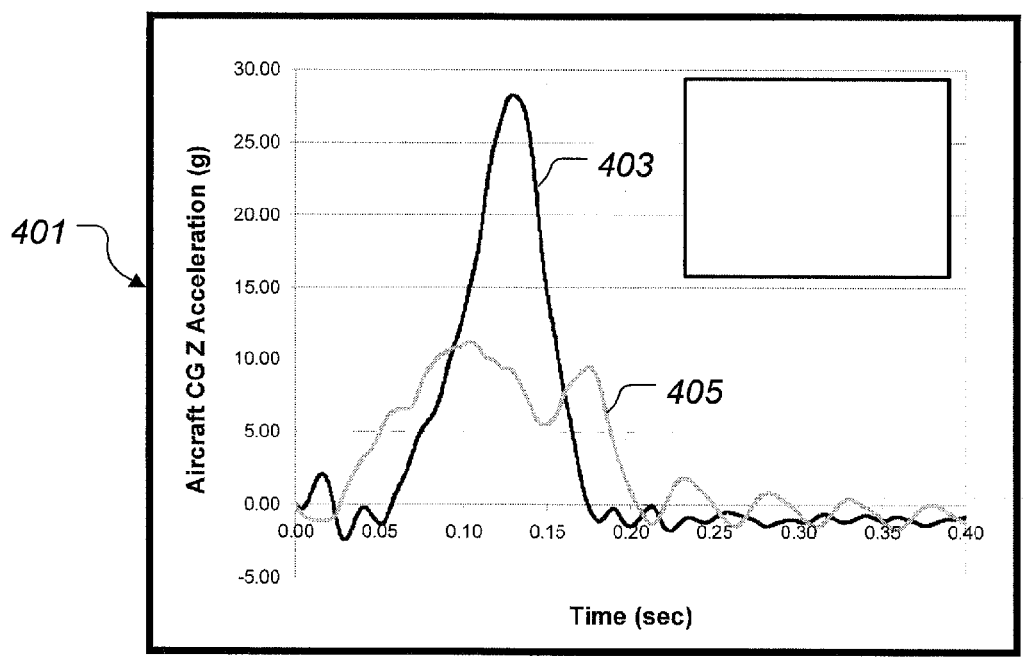
FIG. 4 is a graph of a graphical representation of aircraft vertical acceleration versus time, during a simulated crash test.
Figure 5:
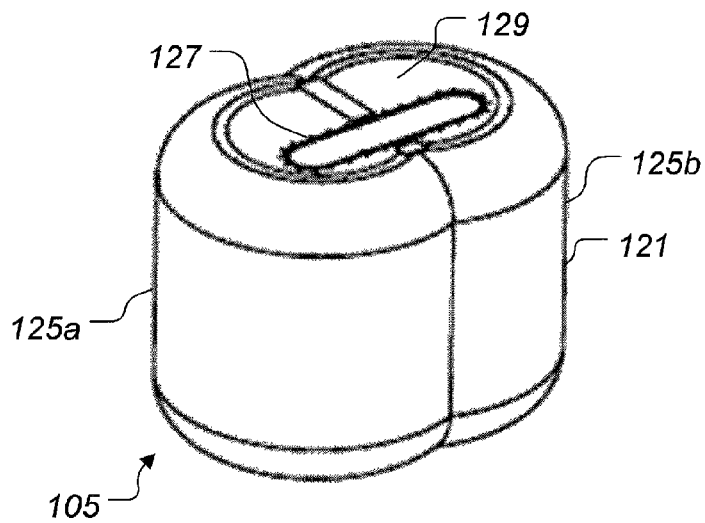
FIG. 5 is a perspective view of an external airbag assembly, according to the preferred embodiment of the present application.
Figure 6:
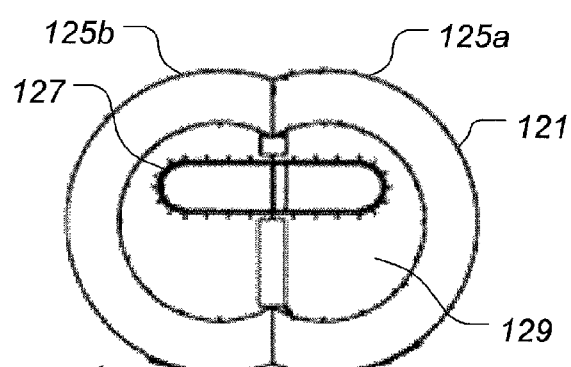
FIG. 6 is a top view of the external airbag assembly of FIG. 5.

Referring to FIG. 4, a graph 401 represents a graphical representation of aircraft vertical acceleration versus time, during a simulated crash test with two different external airbag configurations. During the test, a 12,000 pound aircraft mock-up reached approximately 36 feet per second at impact. Graph 401 provides a visual understanding how certain airbag shapes may provide better crash attenuation than others. A graph line 403 represents the crash test performance of a non-optimally shaped airbag, such as donut shaped airbag. A graph line 405 represents the crash test performance of an optimally airbag shape, such as the shape of airbag assembly 105. As shown the non-optimally shaped airbag provides much less energy attenuation than does airbag assembly 105. Further, the test showed that the non-optimally shaped airbag, having the same volume, resulted in a peak acceleration of approximately 28.2 g, whereas the optimally shaped airbag resulted in a peak acceleration of approximately 11.2 g, where g is a unit of acceleration due to gravity.

Referring now to FIGS. 5-9, a preferred embodiment of airbag assembly 105 is illustrated in further detail. Airbag assembly 105 includes an airbag bladder 121, which is made from a relatively non-porous flexible material. In the preferred embodiment, the airbag bladder 121 is formed of a fabric that comprises resilient material such as Kevlar and/or Vectran. A vent 123a and 123b are each configured for allowing for gas to controllably escape from within the airbag bladder 121.

During operation, each airbag assembly 105 is stored in an uninflated condition underneath the fuselage 107 of rotorcraft 101, as shown in FIG. 1. When an imminent crash situation is detected, each airbag bladder 121 is fully inflated just prior to impact. In the preferred embodiment, the airbag bladder 121 is initially inflated to approximately 5 pounds per square inch (psi); however, an alternative initial pressure may be used. In the preferred embodiment, each vent 123a and 123b is configured to burst at a pressure around 9 psi, thereby releasing gas from the interior of the airbag bladder 121 during the compression of the airbag bladder. It should be appreciated that alternative burst pressures may be used.

The compression of airbag bladder 121 results from the airbag bladder 121 being compressed between the rotorcraft 101 and an impact surface, such as a hard surface, soft soil, water, to name a few.

In an alternative embodiment, vents 123a and 123b are absent from the airbag bladder. For example, a rigid housing located between the airbag bladder 121 and the fuselage 107 may contain a vent passage for venting gas from within the airbag bladder 121 during impact.

Figure 7:
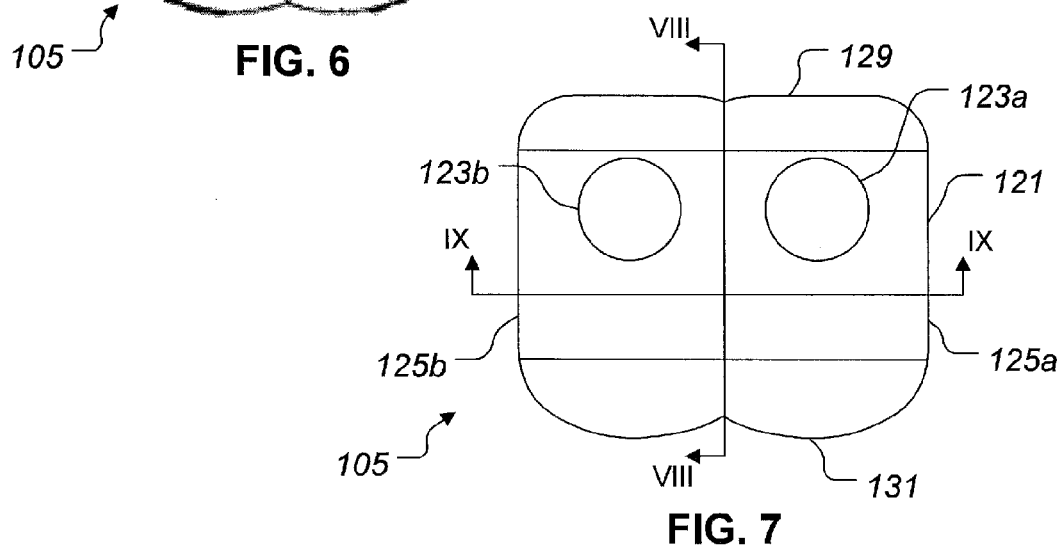
FIG. 7 is a side view of the external airbag assembly of FIG. 5.

The airbag assembly 105 includes a base plate 127 configured to attach the airbag bladder 121 underneath fuselage 107. More particularly, base plate 127 is coupled to a top portion 129 of airbag bladder 121. Base plate 127 is preferably a rigid structure which also functions to at least partially define top portion 129. Referring specifically to FIG. 7, top portion 129 is shown as being a relatively flat surface as compared to a bottom portion 131. The relative flatness of top portion 129 is partly due to the rigid support of base plate 127.

Figure 8:
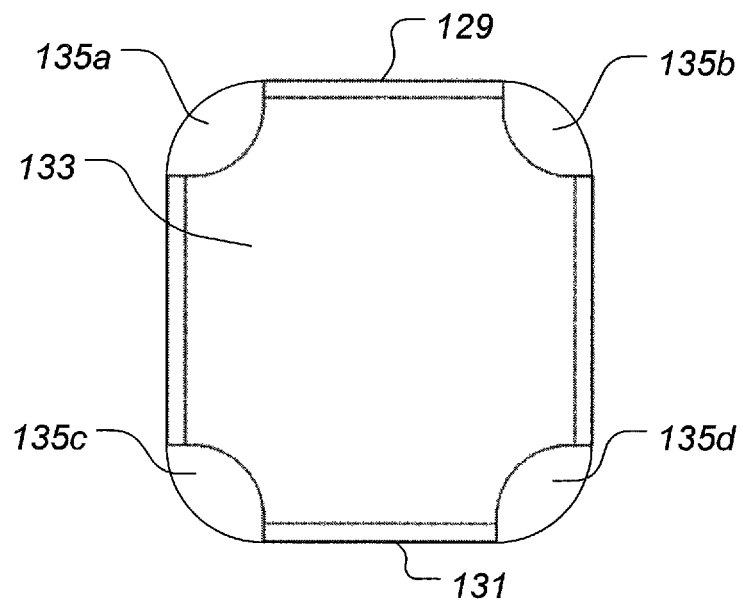
FIG. 8 is a partial section view of the external airbag assembly of FIG. 5, taken along the section lines VIII-VIII in FIG. 7.
Figure 9:
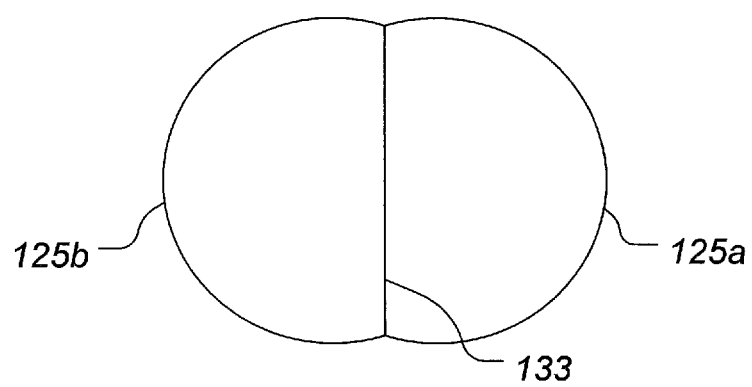
FIG. 9 is a partial section view of the external airbag assembly of FIG. 5, taken along the section lines IX-IX in FIG. 7.

A widthwise panel 133 restricts the airbag bladder 121 in a widthwise direction so as to control the width and height of the airbag bladder 121 approximate to the attachment areas of widthwise panel 133. The pressurized air within airbag bladder 121 causes the air bladder 121 to want to bulge outward. However, widthwise panel 133 is selectively sized and positioned to restrict bulging, so that the inflated shape of airbag bladder 121 approximating a space efficient rectangular prism shape while also reaping the compression benefits of a vertical cylinder. Widthwise panel 133 is attached to the top portion 129, bottom portion 131, and both sides of airbag bladder 121. As such, widthwise panel essentially divides the airbag bladder 121 into two cylindrical portions, a first cylindrical portion 125a and a second cylindrical portion 125b. As shown in FIG. 8, widthwise panel 133 can be attached to top portion 129 and bottom portion 131, thus restricting outward bulging approximate to the location of attachment between widthwise panel 133 and top and bottom portions 129 and 131. Furthermore, widthwise panel 133 can be configured to tailor crash attenuation performance of first cylindrical portion 125a and second cylindrical portion 125b. Widthwise panel 133 is configured with optional apertures 135a-135d to facilitate fluid communication between first and second cylinders 125a and 125b. In an alternative embodiment of airbag assembly 105, apertures 135a-135d are omitted such that widthwise panel 133 prevents fluid communication between first and second cylinders 125a and 125b.

Similar to airbag bladder 121, widthwise panel 133 is preferably formed of a fabric that comprises resilient material such as Kevlar and/or Vectran. Widthwise panel 133 is preferably attached to airbag bladder 121 at a seam through stitching, thermal bonding, adhesive, or other attachment means. In the preferred embodiment, widthwise panel is formed with fabric substantially spanning across the interior of airbag bladder 121. However, it should be appreciated that widthwise panel may also be formed from a plurality of individual straps, netting, cording, or any flexible configuration capable of providing support to airbag bladder 121.

Figure 10:
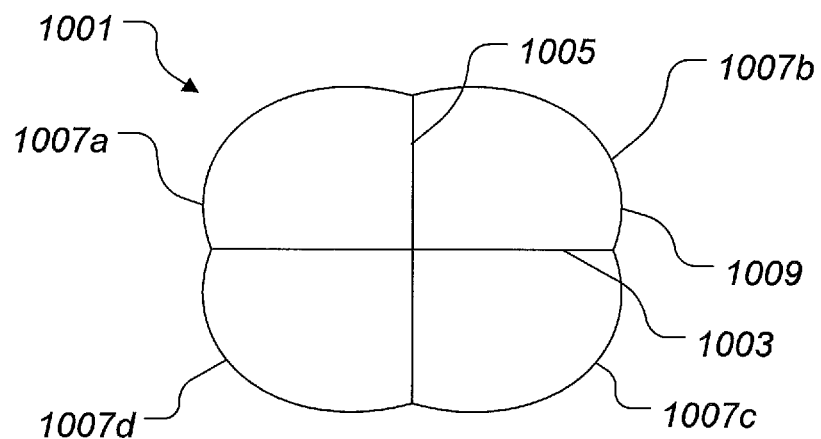
FIG. 10 is a schematic top view of an external airbag assembly according to an alternative embodiment of the present application.

Referring now to FIG. 10, a top view schematic of an alternative embodiment is illustrated. An airbag assembly 1001 is similar to airbag assembly 105 except for having a lengthwise panel 1003 in addition to a widthwise panel 1005. Widthwise panel 1005 is similar to widthwise panel 133. An airbag bladder 1009 is similar to airbag bladder 121. The lengthwise panel 1003 is attached to a top portion, bottom portion, forward portion, and aft portion of airbag bladder 1009, thereby acting to restrict bulging across a length and height of airbag bladder 1009. Lengthwise panel 1003 acts to further restrict outward bulging, so that the inflated shape of airbag bladder further resembles a space efficient optimal shape, such rectangular prism shape 301. As such, airbag assembly 1001 is further configured to maximize contact area between the lower portion of fuselage 107 and a top portion of each airbag bladder 1009. The combination of lengthwise panel 1003 and widthwise panel 1005 results in airbag bladder 1009 having essentially four airbag quadrants 1007a-1007d. Lengthwise panel 1003 and widthwise panel 1005 each preferably include one or more apertures allowing for open gas communication between quadrants 1007a-1007d. It should be appreciated that apertures between quadrants 1007a-1007d are optional.

Figure 11:
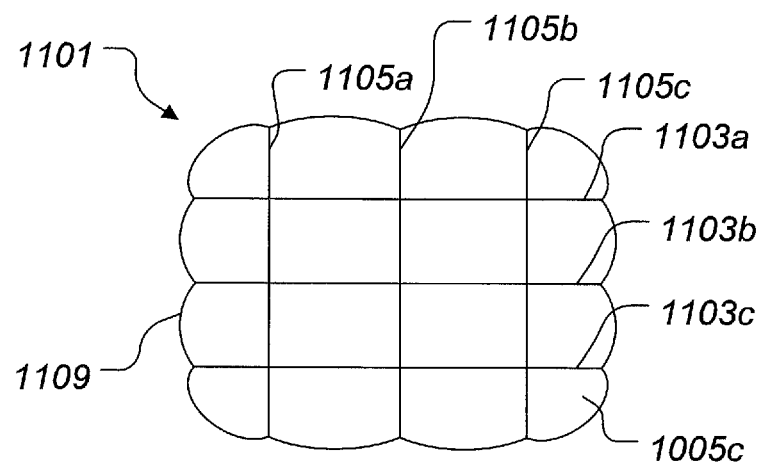
FIG. 11 is a schematic top view of an external airbag assembly according to an alternative embodiment of the present application.

Referring now to FIG. 11, a top view schematic of an alternative embodiment is illustrated. An airbag assembly 1101 is similar to airbag assembly 105 except for having a plurality of lengthwise panels 1103a-1103c and a plurality of widthwise panels 1105a-1105c. Widthwise panels 1105a-1105c are similar to widthwise panel 133. Similarly, an airbag bladder 1109 is similar to airbag bladder 121. Each lengthwise panel 1103a-1103c acts to restrict bulging across a length and height of airbag bladder 1109. Each widthwise panel 1105a-1105c acts to restrict bulging across a width and height of airbag bladder 1109. As such, each widthwise panel 1105a-1105c and lengthwise panel 1103a-1103c act to restrict outward bulging, so that the inflated shape of airbag bladder further resembles a space efficient optimal shape, such rectangular prism shape 301. As such, airbag assembly 1001 is further configured to maximize contact area between the lower portion of fuselage 107 and a top portion of each airbag bladder 1109. Each widthwise panel 1105a-1105c and lengthwise panel 1103a-1103c preferably include one or more apertures allowing for open gas communication within airbag bladder 1109.

Figure 12:
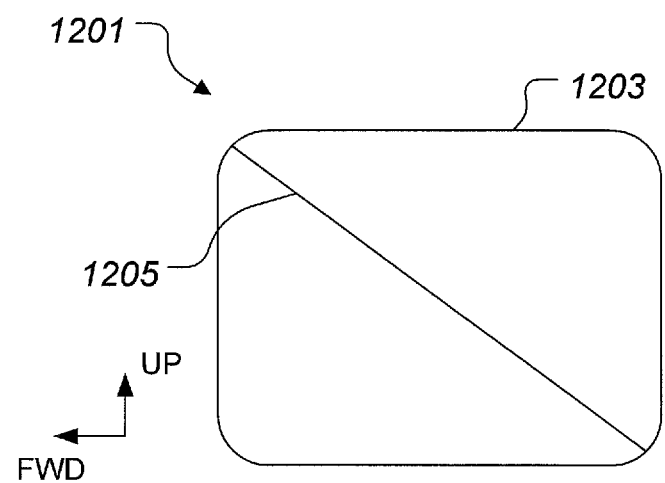
FIG. 12 is a schematic side view of an external airbag assembly according to an alternative embodiment of the present application.

Referring now to FIG. 12, a side view schematic of an alternative embodiment is illustrated. An airbag assembly 1201 is similar to airbag assembly 105. However, airbag assembly 1201 includes a diagonal panel 1205 spanning from a forward/upper edge to an aft/lower edge of an airbag bladder 1203. If rotorcraft 101 impacts a crash surface while having a forward velocity, an external airbag has a tendency to want to deform toward an aft direction. Diagonal panel 1205 functions to resist deformation of airbag bladder 1203 that would otherwise occur when rotorcraft 101 impact the crash surface with a forward velocity. As such, diagonal panel 1205 acts to restrict a rolling over deformation of airbag bladder 1203 that might otherwise occur due to a forward velocity crash landing, so that the inflated shape of airbag bladder retain resemblance a space efficient optimal shape, such rectangular prism shape 301. It should be appreciated that airbag assembly 1201 may further include any number of widthwise and lengthwise panels, as discussed further herein.

The airbag assemblies 105, 1001, 1101, and 1201 provide significant advantages, including (1) providing an external airbag that closely resembles a space efficient optimal airbag shape, such as a rectangular prism, while also reaping the compression benefits of a vertical cylinder shape; (2) providing an external airbag that reduces peak decelerative forces on an aircraft during an impact; (3) providing an external airbag having increased stroke efficiency, thereby allowing the external airbag to have lower height than would otherwise be required, and (4) providing an external airbag that resists rolling over when the aircraft having a forward velocity component impacts the impact surface.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. An external airbag for minimizing peak accelerations of an aircraft during a crash landing, the external airbag comprising:
   a selectively deployable inflatable bladder having a top portion and a bottom portion, the top portion being generally adjacent to an exterior of the aircraft, the top portion and the bottom portion defining a length and a central axis normal to the aircraft, the inflatable bladder being configured to maintain a selected rectangular shape while absorbing compressive loads along the central axis from the bottom portion contacting a surface;
   a widthwise panel dividing the inflatable bladder into a first cylindrical portion and a second cylindrical portion, the widthwise panel being parallel to the central axis of the inflatable bladder and configured to maintain the shape of the inflatable bladder under compression, such that the aircraft experiences approximately linear deceleration during the crash landing; and
   a base plate located on the inflatable bladder, the base plate being configured to couple the top portion of the external airbag beneath a fuselage of the aircraft;
   wherein the base plate partially defines the shape of the top portion;
   wherein the first cylindrical portion is forward of the second cylindrical portion;
   wherein the widthwise panel entirely spans across an interior of the inflatable bladder; and
   wherein the widthwise panel is configured to prevent fluid communications between the first cylindrical portion and the second cylindrical portion.

2. The external airbag according to claim 1, further comprising:
   a lengthwise panel dividing the first cylindrical portion into a first quadrant and a second quadrant, the lengthwise panel also dividing the second cylindrical portion into a third quadrant and a fourth quadrant.

3. The external airbag according to claim 1, wherein the widthwise panel is connected to the top portion and the bottom portion, thereby restricting the top portion and the bottom portion from bulging approximate to where the widthwise panel is connected to the top portion and the bottom portion.

4. The external airbag according to claim 1, wherein the widthwise panel restricts outward bulging in the top portion and the bottom portion, thereby increasing a stroke efficiency of the external airbag.

5. The external airbag according to claim 1, wherein the widthwise panel connects radial side portions of the inflatable bladder, so as to restrict the width of the inflatable bladder.

6. The external airbag according to claim 1, further comprising:
a vent configured to release gas from within the inflatable bladder during compression of the inflatable bladder.

7. The external airbag according to claim 1, further comprising:
a gas generator operably associated with the inflatable bladder, the gas generator configured to selectively inflate the inflatable bladder prior to an impact.

8. An external airbag for minimizing peak accelerations of an aircraft during a crash landing, the external airbag comprising:
a selectively deployable inflatable bladder having a top portion and a bottom portion, the top portion being generally adjacent to an exterior of the aircraft, the top portion and the bottom portion defining a length and a central axis normal to the aircraft, the inflatable bladder being configured to maintain a selected shape while absorbing compressive loads along the central axis from the bottom portion contacting a surface;
a widthwise panel having a rectangular shape, the widthwise panel attached to the top portion, the bottom portion, and sides of the inflatable bladder, the widthwise panel being parallel to the central axis of the inflatable bladder and configured to maintain the shape of the inflatable bladder under compression, such that the aircraft experiences approximately linear deceleration during the crash landing;
a base plate located on the inflatable bladder, the base plate being configured to couple the top portion of the external airbag beneath a fuselage of the aircraft;
wherein the base plate spans across the top portion of the inflatable bladder;
wherein the widthwise panel forms a forward cylindrical portion and an aft cylindrical portion;
wherein the widthwise panel is configured to prevent fluid communications; and
wherein the widthwise panel restricts outward deformation of the inflatable bladder and substantially spans across an interior of the inflatable bladder; and
wherein the selected shape is a space efficient rectangular prism shape adjacent the widthwise panel.

9. The external airbag according to claim 8, further comprising:
a lengthwise panel attached to the top portion, the bottom portion, a forward portion, and an aft portion;
wherein the lengthwise panel restricts outward deformation of the inflatable bladder.

10. The external airbag according to claim 8, further comprising:
a vent located on the inflatable bladder.

11. The external airbag according to claim 8, further comprising:
a gas generator operably associated with the inflatable bladder, the gas generator configured to selectively inflate the inflatable bladder prior to an impact.

12. The external airbag according to claim 8, wherein the widthwise panel restricts outward bulging in the top portion and the bottom portion, thereby increasing a stroke efficiency of the external airbag.

13. An external airbag for minimizing peak accelerations of an aircraft during a crash landing, the external airbag comprising:
a selectively deployable inflatable bladder located exterior to the aircraft, the inflatable bladder having a top portion, and a bottom portion, the top portion being generally adjacent to an exterior of the aircraft, the inflatable bladder being configured to maintain a selected shape while absorbing compressive loads along a central axis from the bottom portion contacting a surface;
a diagonal panel located within the inflatable bladder, the diagonal panel being configured to resist a rolling distortion of the inflatable bladder, the diagonal panel extending from the top portion and a forward side of the inflatable bladder to the bottom portion and an aft side of the inflatable bladder to resist deformation of the inflatable bladder due to a forward velocity of the aircraft during the crash landing, such that the aircraft experiences approximately linear deceleration during the crash landing;
a base plate located on the inflatable bladder, the base plate being configured to rigidly couple the top portion of the external airbag beneath a fuselage of the aircraft;
wherein the diagonal panel is configured to prevent fluid communications;
wherein the selected shape resembles a space efficient rectangular prism shape; and
wherein the diagonal panel spans across the entire inflatable bladder.

14. The external airbag according to claim 13, further comprising:
a widthwise panel attached to the top portion, the bottom portion, and sides of the inflatable bladder, the widthwise panel being parallel to the central axis of the inflatable bladder and configured to maintain the shape of the inflatable bladder under compression, such that the aircraft experiences approximately linear deceleration upon during the crash landing; and
wherein the widthwise panel restricts outward deformation of the inflatable bladder.

15. The external airbag according to claim 13, further comprising:
a lengthwise panel attached to the top portion, the bottom portion, a forward portion, and an aft portion;
wherein the lengthwise panel restricts outward deformation of the inflatable bladder.

* * * * *